March 12, 1935.  F. L. FULKE  1,994,019
CUTTER CHAIN
Filed March 6, 1933   3 Sheets-Sheet 1

INVENTOR.
Frank L. Fulke,
BY
Hood & Hahn
ATTORNEYS

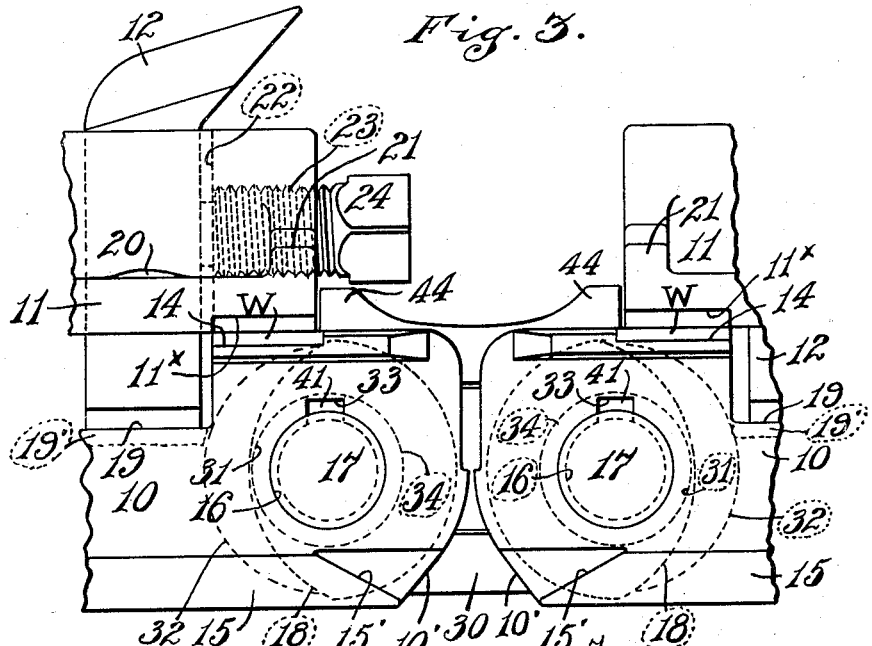
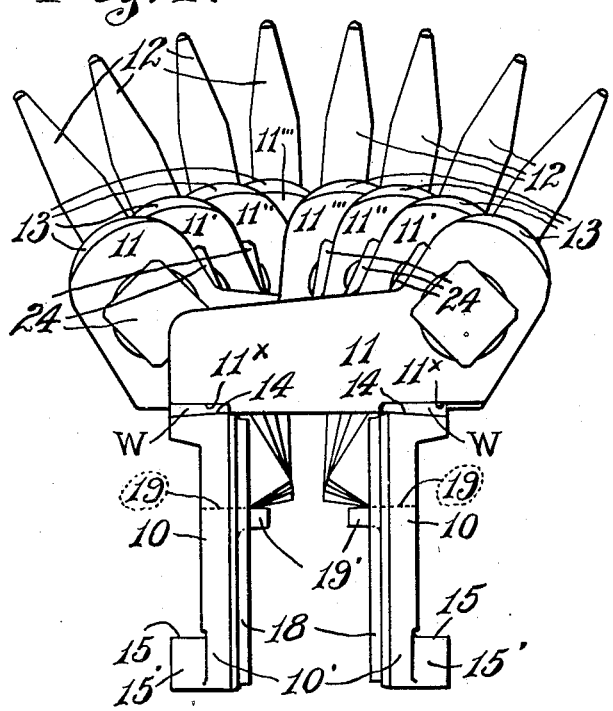
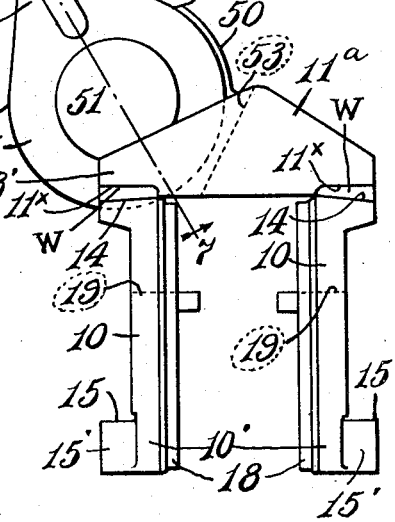

March 12, 1935.　　　　F. L. FULKE　　　　1,994,019
CUTTER CHAIN
Filed March 6, 1933　　　3 Sheets-Sheet 3
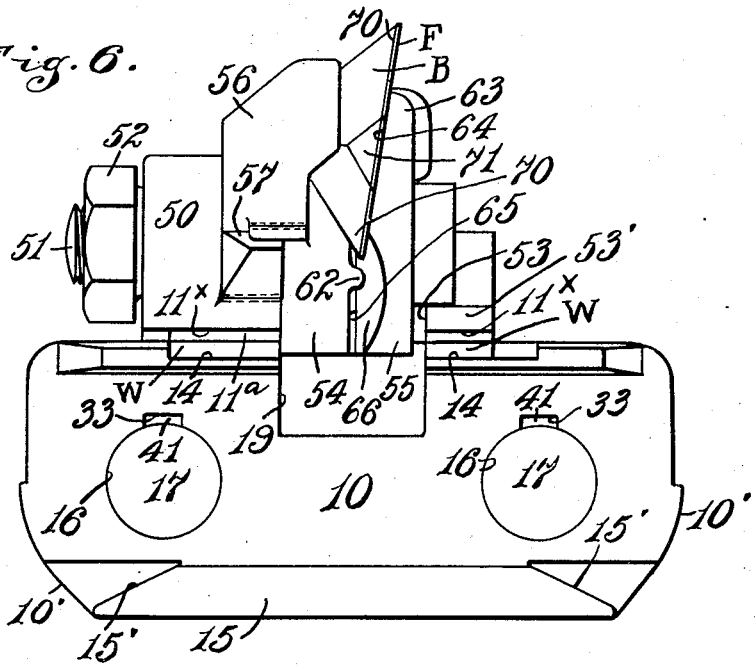
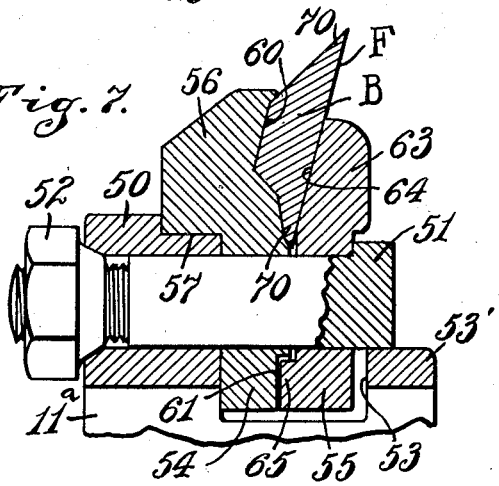
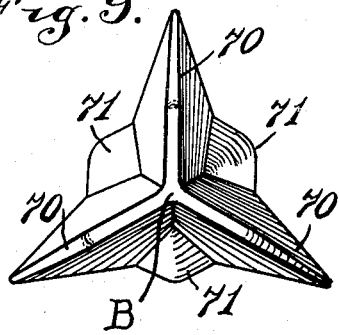
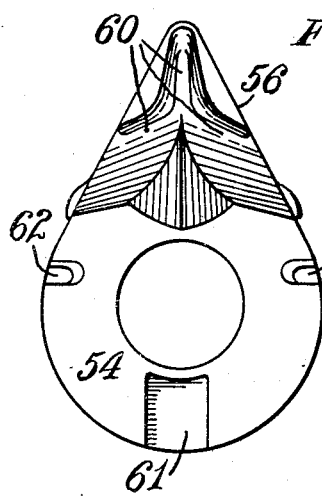
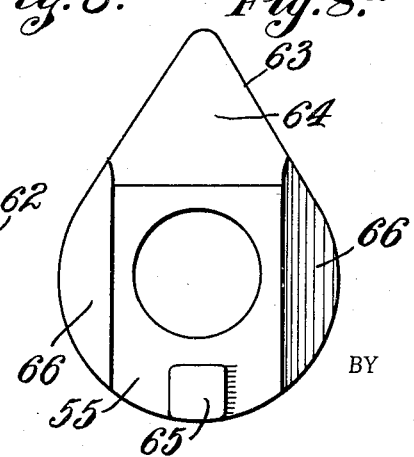
INVENTOR.
Frank L. Fulke,
BY
Hood + Hahn
ATTORNEYS Patented Mar. 12, 1935

1,994,019

UNITED STATES PATENT OFFICE 1,994,019

CUTTER CHAIN

Frank L. Fulke, Terre Haute, Ind., assignor to Frank Prox Company, Terre Haute, Ind., a corporation of Indiana Application March 6, 1933, Serial No. 659,679

13 Claims. (Cl. 262—33)

This invention relates to cutter chains which are supported by suitable guides and which comprise a plurality of bit-carrying links which support kerfing bits so distributed laterally of the chain that a kerf of a width sufficient to permit chain travel therethrough, may be produced. The chain is primarily used in mining machines.

Chains of this character are subjected to exceedingly heavy stresses and destructive abrasive action and various makes of machines, in which they are used, while having chain guides of the same general character, differ slightly as to thickness of usable chain.

Among the objects of my invention are the following:

To provide a chain comprising bit-carrying links which may be economically produced in various desired thicknesses from a minimum number of standard parts.

To provide a cutter chain in which each portion of the bit-carrying links may be efficiently formed of material best adapted to withstand the wear to which it is subjected in use.

To provide an improved grouping of bit angles relative to the center line of the chain so as to reduce the angularity necessary for the production of clearance.

To provide an improved journal construction in the bit-carrying links.

To provide a novel proportioning of bit-carrying links and connecting links whereby an unusually large number of bit-carrying links may be incorporated in a chain of given length without sacrifice of strength.

To provide a stronger and more durable chain than has heretofore been produced, and to provide such other improvements as shall be hereinafter pointed out.

The accompanying drawings illustrate my invention.

Figure 1:
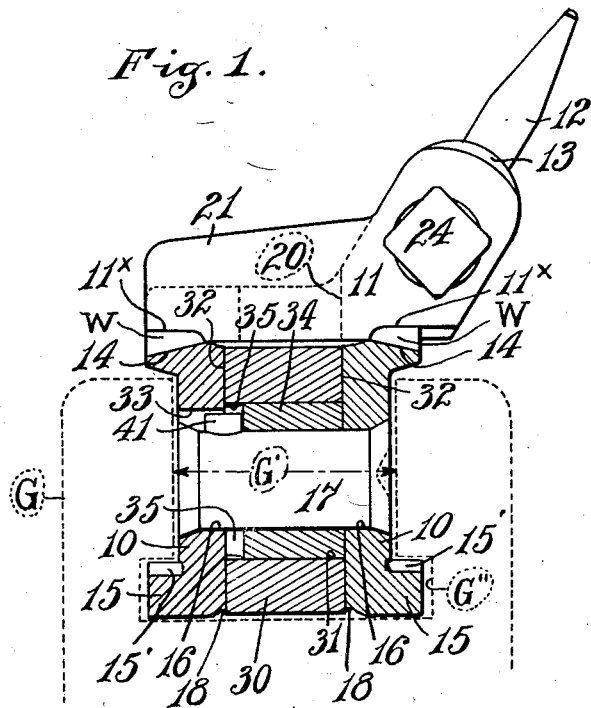
Figure 2:
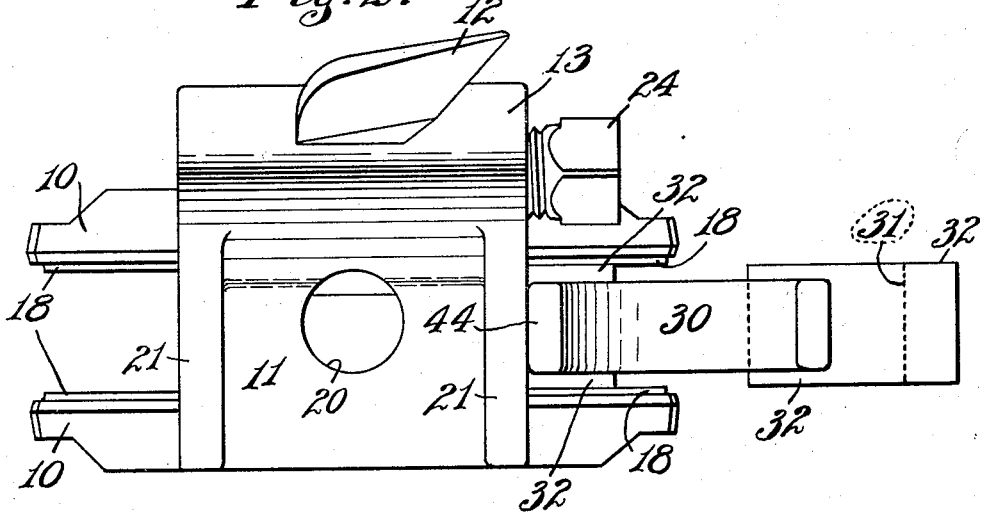

Fig. 1 is a transverse section of an embodiment of my invention axially through one of the pivot pins, the usual associated guiding structure being shown in dotted lines;

Fig. 2 a plan of one of my improved bit-carrying links and associated connecting link;

Fig. 3 a side elevation of adjacent ends of two bit-carrying links and the connecting link;

Fig. 4 an end elevation of a plurality of aligned bit-carrying links showing a preferred angular arrangement of bits;

Fig. 5 an end elevation of a bit-carrying link embodying my invention in a form capable of receiving a different form of cutter bit;

Fig. 6 a side elevation of the structure shown in Fig. 5;

Fig. 7 a section on line 7, 7 of Fig. 5;

Fig. 8 an elevation of the mating face of one of the bit-carrying jaws of the structure shown in Figs. 5 and 6; Fig. 8a an elevation of the mating face of the other one of the bit-carrying jaws of the structure shown in Figs. 5 and 6; and Fig. 9 a plan of the bit shown in Figs. 5 to 7.

Referring first to Figs. 1 to 4 inclusive—My improved bit-carrying link is formed from the two identical side plates 10, 10 and one of a series of cross blocks 11, 11', 11", 11''' etc. welded to the side plates, as indicated at W, the cross blocks being identical except as to the angular relation of its bit-carrying portion relative to the lateral plane of the link.

By constructing the bit-carrying link from the three above-mentioned parts it is possible to make the side links of easily machinable steel, as for instance drop forgings of high tensile strength capable of resisting the heavy shocks and pulls to which the link bodies are subjected, and to easily machine these side plates before they are associated with a cross block. It is also possible to make the cross blocks of material especially adapted to resist the abrasions to which these portions of chains of this character are subjected, because, while such material as for instance steel castings, may not be readily machined, they may be initially cast with suitably arranged cored openings for receiving the bits 12 and holding them at desired angles.

By forming my bit-carrying link of the three parts mentioned I am able to avoid a difficult broaching operation which would otherwise be necessary to provide for a suitable bit receiving opening in the link, and the cross block may be of a material having a high abrasion resistance and consequently not practically subjectable to a broaching operation. The cross blocks may also be subjected to a separate heat treatment to increase abrasion resistance and, if desired, especially exposed parts of these cross blocks may be further protected by fusing thereto, as indicated at 13, a metal extremely resistant to abrasion.

Each side link, along its upper edge is outwardly and downwardly chamfered, as indicated at 14 and the lower face of cross block 11, along its side edges, is also chamfered, as indicated at 11× to afford a pocket for the welding metal W. Each side plate 10 is also provided along its lower edge with an outwardly-projecting guide rib 15 and each side plate is perforated at two points 16, 16 for the reception of the cross pins (conveniently rivets) 17, and surrounding these perforations, on the inner vertical faces of the side plates are spotting surfaces 18 the height of which may be more or less reduced by machining, depending upon the ultimate thickness of chain which may be desired. Each side link medially of its upper edge is notched, at 19, to afford room for the lower ends of bits 12 and to afford an outlet for material which might otherwise become jammed between the side plates and beneath the cross block, the horizontal web of the cross block being also perforated at 20 between the vertical bracing ribs 21, 21.

Projecting inwardly at the root of each notch 19 is a rib 19' so arranged as to prevent inward projection of bits 12 to positions which would engage the teeth of the sprocket wheels over which the chain is to operate.

Extending through each cross block is a cored opening 22 adapted to receive a cutter bit 12 of usual form and intersecting this perforation is a threaded opening 23, parallel with the length of the link for the reception of the clamping screw 24.

It is customary in cutter chains of this general type to group the bits centrally relative to the length of the chain, i. e., to radiate the several bits outwardly from a substantially common axis located at about the middle of the chain and usually the outside bit angle is forty-five degrees from the medial plane of the chain, thereby providing an attack angle of ninety degrees between the two bits most extremely projected. An ordinary chain generally embodies several such groups of bits arranged in series along the length of the chain.

I have found in practice that sufficient chain clearance may be produced by the bits if the bits are grouped angularly about two nucleal lines extending lengthwise of the chain upon opposite sides of its medial plane, as clearly indicated in Fig. 4.

By this arrangement the lateral angles of the bits relative to the medial plane of the chain may be reduced, without sacrifice of total bit-spread, thereby making it possible to set the outermost bits at angles much less than forty-five degrees from the medial plane of the chain. As a consequence twisting stresses on the chain are materially reduced without sacrifice of kerf width.

In other words, the attack of the outermost bits on the coal is more nearly balanced on the tips of the bits and there is less side-edge scraping as distinguished from tip cutting.

In building my improved chains I find it most economical to provide a series of cross blocks 11, 11', 11'', 11''', etc., each having a bit pocket at one of the desired bit angles and, as the blocks can be optionally reversed endwise for welding to the plates it will be apparent that by providing four cross blocks each with its own distinctive bit angle, a group of eight bit-carrying links, each with its own distinctive bit angle may be provided.

In assembling any bit links the blocks 11 will normally be balanced on the two side plates and four blocks 11, 11', 11'' and 11''' each with a bit socket of distinctive angle would therefore provide, in a completed chain, an eight-position grouping of bits relative to the medial plane of the chain. By laterally offsetting a block 11, relative to a balanced relation on its side links an almost infinite variety of lateral offsets of the bit points relative to the medial plane of the chain may be provided with a minimum number of standard parts, i. e., one standard side plate and from three to five standard cross blocks.

It will be readily understood that the bit-carrying passages of some of these cross blocks may be so arranged that the bits whose points lie closest to the medial plane of the chain may be arranged at such an angle as to have their cutting ends projected to positions which are beyond the medial plane of the chain, as compared with the lower inner ends of those bits.

One of the prime objects sought in this invention is to increase the number of bit links in a chain of given length without sacrifice of strength or other advantage and I have attained this objective to the extent of being able to provide 43 bit links in my chain having a length corresponding to other cutter chains in which not more than 36 bit links may be incorporated.

Obviously, an increased number of bit-carrying links of any construction might be incorporated in a chain of given length by shortening the distance between link centers, (i. e., the distance between the axes of the two pivot pins), but such a change in dimension would ordinarily result in cutting down vital cross sections of metal thereby sacrificing strength.

In order to obtain a greater number of bit-carrying links in a chain of given strength I make my bit-carrying links of standard length but connect them with shorter connecting links 30 so that the adjacent ends of the two connected bit-carrying links will almost abut, as indicated in Fig. 3, and each of these links is provided with two sleeve-receiving perforations 31, 31 which may be axially aligned with the perforations 16, 16 of the bit-carrying links. Each of these perforations 31 is surrounded, at each side of link 30, with raised spot surfaces 32, 32, and the forgings from which these links are made are conveniently all given a maximum thickness between opposed surfaces 32, 32.

In order to obtain a completed bit link of desired thickness, so that it may properly coordinate with a guideway G (shown in dotted lines in Fig. 1), the spotting surfaces 32 of links 30 and 18 of side plates 10 are machined so that the cross dimension between the outer surfaces of the side plates will afford a sliding fit with the dimension G' of the guideway.

Perforation 16 of the side plate 10 is notched at 33, and fitting between the spotting surfaces 18, 18 of the side plates 10 is a hardened bearing sleeve 34, one end of which is similarly notched at 35. This notch in the sleeve may conveniently, though not necessarily, be formed at both sides of the bore of the sleeve. The sleeve has an external diameter fitting perforations 31 of link 30 and an internal diameter corresponding with perforation 16. The outer ends of the perforations 16 are counter-sunk, as indicated in Fig. 1, and a rivet 17 unites the several links, said rivet being provided just under its initial head with a radially-extended spud 41 which may enter and interlock with notches 33 and 35.

Owing to the shortness of the connecting links 30 it is not feasible to provide these connecting links with outwardly flaring ribs which may run in the portions G'' of the guiding structure and in order to avoid difficulties which might arise as a result of the absence of such ribs I eliminate the possibility of reverse flexure of the chain by providing the connecting links 30 with outwardly-extending lugs 44 which have a one-way engagement with the adjacent cross blocks 11, which blocks, as clearly indicated in Fig. 2, have a dimension in the length of the chain considerably less than the corresponding dimension of the side plates. To further compensate for the absence of guide ribs on the connecting links 30 the guide ribs 15 are extended considerably beyond the axes of the pivot pins and their ends are chamfered as indicated at 15', the lower corners of the side plates 10 being curved as indicated at 10' (Fig. 3).

By selective reduction of the spotting surfaces 18 and 32 (either or both) any desired chain thickness can be obtained by a proper positioning of the side plates 10 with relation to the cross blocks 11 before welding. It will also be noted that the side plates 10 are identical so that a single die is sufficient for their production and uniform machining operations may be performed on these forgings, in advance of assembly, to properly size ribs 15, perforations 16 and spots 18.

The cross blocks 11 require no machining operation other than the formation of the threads in perforation 23, and where castings of unmachinable steel are used, softer thread receiving plugs may be cast therein.

The machining operations having been performed, two standard side plates 10, 10 are held in a suitable jig properly spaced to correspond to the desired chain thickness and one of the cross blocks 11 is welded thereto, its bit-receiving perforation 13 aligning with notch 19 of the adjacent side plate.

Two sleeves 34 are then appropriately positioned in the perforations 31 of a properly dimensioned connecting link 30 and inserted between the side plates, whereupon rivet 17 is projected through the perforations 16 and sleeve 34 with spud 41 interlocking with the adjacent side plate in notch 33 and with bushing 34 in notch 35, whereupon its free end is riveted into the adjacent countersinking of plate 10. The hardened sleeve 34 is thus firmly held against rotation and the side plates are firmly clamped upon the ends of the bearing sleeve.

Referring now to Figs. 5 to 9.

The fundamental characteristics of the bit-carrying link shown in these figures are the same as in the preceding views but modifications are made in order to adapt the link to support a three-pointed bit with any one of its three points in active position.

The cross block 11a corresponds to block 11 in the other form, and it is welded to the side plates as previously described. Block 11a is provided at one end with a projecting ear 50 which is perforated parallel with the length of the chain to receive the clamping bolt 51, the outer end of the perforation being countersunk to receive the tapered end of the clamping nut 52. At an intermediate point in its length, adjacent the inner end of ear 50 the outer edge of the block is notched at 53 and beyond this notch is the finger 53' which is parallel to ear 50. Sleeved upon bolt 51 and nested in notch 53 are two bit clamping jaws 54 and 55 between which the bit B, which is of novel form, may be firmly clamped. The main body of jaw 54 is substantially annular and at one side of its bore is a radially-projecting lug 56 which also projects axially from one face of the jaw and overlies shoulder 57 formed on block 11a, thereby bracing the jaw against forces applied to the bit. What may be termed the inner face of lug 56 is provided with a bit-pocket comprising primarily three grooves 60 which radiate from a common center. The inner face of the main body of jaw 54 has formed therein diametrically opposite from lug 56, a shallow pocket 61 and this inner face also carries, at opposite sides of its bore, a pair of teats 62.

Jaw 55 at one side is provided with a radially-projecting finger 63 which opposes lug 56 and the inner face 64 of this lug is adapted to engage the flat face of the bit. Diametrically opposite finger 63 the inner face of jaw 55 carries a lug 65 formed to seat in pocket 61. At opposite sides of its bore the inner face of jaw 55 is chamfered at 66, 66 to cooperate with removal or insertion of a bit as will be described later.

My new cutting bit B is of a form which requires an exceedingly small amount of metal so that it may be economically made from very high grade material. It comprises three radiating fingers 70 strengthened if desired by the intermediate fillets 71, the fingers and fillets originating from the flat face F and the backs of the fingers being so formed as to nest within the radiating grooves 60 of jaw 54 with the flat face F engaged by face 64 of finger 63.

The head of bolt 51 is flattened at one side so as to engage the upper surface of finger 53' of cross block 11a so as to hold the bolt against turning within the ear 50.

It will be noted that the bit B may be so arranged between the clamping jaws as to present any one of its three points in active position and it will of course be understood that the surfaces 57 of blocks 11a may be arranged at different angles relative to the general plane of the link so that the active points of the bits in a complete chain may be presented at different distances from the medial plane of the chain in the general manner illustrated in Fig. 4. It will also be understood that instead of preventing rotation of jaw 54 by the interaction of surface 57 and the shoulder formed by lug 56, surface 57 may arcuate and be overlaid by the shoulder formed by lug 56 so as to preserve the bracing effect, and other angular interlocking means between jaw 54 and ear 50 may be provided.

The notch 53 has a dimension lengthwise of the link somewhat in excess of the combined axial dimension of the two clamping jaws, this excess being sufficient when the clamping bolt is loosened, to permit jaw 55 to be axially separated from jaw 54 enough to separate the non-rotative interlock due to the interaction of lug 65 with recess 61. So that, upon loosening nut 52 jaw 55 may be rotated relative to bit B enough to permit said bit to be readily withdrawn from the pocket formed by the radiating grooves 60 in jaw 54, and chamfered portions 66 cooperate, it being understood that lug 65 abuts against teat 62 at the point in the rotation of jaw 55 when chamfered portion 66 will cooperate for the removal of bit B from bit pocket of jaw 54. This arrangement is highly desirable because it permits the quick removal of a worn bit and the replacement of a new one without considerable unscrewing of bolt 51.

It will be noticed from Fig. 4 that, owing to the fact that the bits throughout the chain length radiate from two nucleal lines parallel with the chain length on opposite sides of the medial plane of the chain the lateral distance between the extreme bits may be great enough to produce a kerf affording adequate clearance for the chain but that the extreme bits do not need as much inclination from the said medial plane as heretofore. As a consequence, the angle of attack of the bits upon the coal or other material is much more effective than heretofore so that bit life is increased.

The sides of fingers 70 preferably converge toward the tip of the finger at an included angle somewhat less than 60 degrees so that the finger is exceedingly effective in its raking action.

I claim as my invention:

1. A bit-carrying link for cutter chains comprising two laterally spaced side plates and a connecting head welded to the upper edges of both side plates, said head having a bit-receiving opening angularly disposed relative to the median plane of the link.

2. A bit link having side plates spaced apart and connected together at their upper edges by a head having an angularly disposed opening through it for holding a bit, and a bit stop carried by the adjacent side plate between its upper and lower edge substantially central the ends of the plate and in bit-blocking alignment with said angularly disposed opening.

3. A bit link having side plates spaced apart to receive connecting links between their ends and rigidly connected by a roof plate, the side plates having coaxial rivet openings, a rivet passing through said openings, a sleeve carried between the plates on the rivet, and a projecting lug on the rivet taking partly into a recess in the sleeve and partly into a lateral recess in a rivet opening.

4. A cutter-chain bit link comprising a pair of laterally-spaced drop forged side plates, and a cast link head welded to the upper edges of both side plates.

5. A cutter-chain bit link comprising a pair of laterally-spaced forged side plates and a cast link head having a transverse bit opening and welded to the upper edges of both side plates.

6. A cutter-chain bit link comprising a pair of laterally-spaced side plates and a bit holding cross block of dissimilar material welded to the upper edges of both side plates.

7. A cutter-chain bit link comprising a pair of laterally-spaced side plates, a bit holding cross block welded to the upper edges of both side plates, and a hard facing material fused by heat to a portion of the outer surface of the crosshead.

8. A cutter-chain bit link comprising a pair of individual side plates each having inward projections on their inner walls capable of height reduction to adjust the link body to various desired thickness as described, and a cross head welded to the upper edges of both plates.

9. A bit link for cutter chains comprising a top cross-block having an upstanding ear longitudinally bored to one side of the median line of the block, two separate side plates welded at their upper edges to said cross-block on opposite sides of the median line of the block, a bolt mounted in said bore, and bit-clamping means associated with said bolt and ear.

10. The method of constructing bit-links for cutter chains which comprises providing a bit-supporting cross-block and two separate side plates each having a longitudinal rib projecting from the outer face along the lower edge and intermediate projections rising from the inner face, reducing the height of said intermediate projections in accordance with desired lateral spacing of said plates, and welding the upper edges of said plates to the under surface of the cross-block in parallel desired spaced relation.

11. The method of constructing cutter chains which comprises providing a bit-supporting cross-block, a pair of separate side plates each having a longitudinal rib projecting from the outer face along the lower edge and thickened at two intermediate points by projections rising from the inner face, and a connecting link having ends thicker than its middle, predetermining the working-thickness of the chain by reducing the thickness of some of said elements without reducing the tensile strength of such elements as a whole, providing perforations in said plates and connecting link through their said thick portions, and welding the upper edges of the side plates to the under surface of the cross block in parallelism and laterally spaced slightly greater than the end thickness of said connecting link.

12. A cutter-chain bit link comprising a pair of laterally-spaced side plates and a cross block welded to and connecting the upper edges of said plates, said cross block having a bit-receiving socket.

13. A cutter-chain bit link comprising a pair of laterally-spaced side plates having portions adjustably machinable for obtaining completed links of various thicknesses and a connecting cross block welded to edges of both side plates and having a bit-receiving socket.

FRANK L. FULKE.